Patented May 18, 1954

2,678,949

UNITED STATES PATENT OFFICE 2,678,949

METHOD FOR PRODUCING ALKYL SUBSTITUTED AMINE BORINES

Mario D. Banus, Ipswich, and Thomas R. P. Gibb, Jr., and Robert W. Bragdon, Marblehead, Mass., assignors, by mesne assignments, to the United States of America as represented by the United States Atomic Energy Commission No Drawing. Application February 28, 1952,
Serial No. 274,076

6 Claims. (Cl. 260—583)

This invention relates to a method for preparing alkyl substituted amine borines, such as trimethylamine borine, triethylamine borine, etc.

The preparation of trimethylamine borine by reacting lithium borohydride with trimethylammonium chloride in ether solution has been reported in the literature (J. Am. Chem. Soc. 71, 2143). The products resulting from this reaction are hydrogen, lithium chloride and trimethylamine borine. The products of this reaction mixture may be isolated by removal of the ether by distillation and by subsequent sublimation of the boron compound from the solid residue in vacuum.

We have discovered that alkyl substituted amine borines containing not more than twelve carbon atoms may be produced by the simple thermal decomposition of quaternary ammonium borohydrides, such as tetramethyl ammonium borohydride, tetraethylammonium borohydride, trimethylbenzylammonium borohydride, etc.

In our copending application, Serial No. 230,264, filed June 6, 1951, we have described a method for preparing tetraalkyl, trialkylaryl and trialkylalkaryl ammonium borohydrides, such as tetramethylammonium borohydride, tetraethylammonium borohydride, trimethylbenzylammonium borohydride, phenyltrimethyl ammonium borohydrides, etc. In that application, we have claimed these quaternary ammonium borohydrides as new products. These products, as described in that application, are prepared by reacting metathetically an alkali metal borohydride with a quaternary ammonium compound, such as tetramethylammonium hydroxide, in a polar solvent for both the alkali metal borohydride and the quaternary ammonium compound. The reaction products are the quaternary ammonium borohydride and the alkali metal compound corresponding to the quaternary ammonium compound used. A polar solvent is selected in which one of the reaction products is less soluble than either the alkali metal borohydride or the quaternary ammonium compound. For example, tetramethylammonium hydroxide may be reacted in water solution with sodium borohydride to form sodium hydroxide and tetramethylammonium borohydride. The latter precipitates and may be separated from the solution by filtration.

In our investigation of the properties of these novel quaternary ammonium borohydrides, we have discovered that they can be decomposed by heating at a temperature beginning at about 150° C. The rate of decomposition increases at higher temperatures; the log of the rate of decomposition is inversely proportional to the reciprocal of the absolute temperature. There is a definite induction period which decreases as the temperature increases. Unlike the alkali metal borohydrides, which thermally decompose to give hydrogen and a boride, the products of thermal decomposition of quaternary ammonium borohydrides are principally a volatile borine and a hydrocarbon gas. Their thermal decomposition is illustrated by the following equation:

$$(CH_3)_4NBH_4 \rightarrow (CH_3)_3N:BH_3 + CH_4$$

The volatile borine may be condensed at a lower temperature, such as room temperature, and thus separated as a solid from the hydrocarbon gas. The temperature used for producing amine borines by the thermal decomposition of the quaternary ammonium borohydrides may vary within a wide range between about 150° C. and the decomposition temperature of the amine borine.

The invention is illustrated further by the following specific examples.

Example 1

The apparatus used was a tube having an inlet opening for introducing the quaternary ammonium borohydride. The tube also was provided with connections for joining it to a vacuum line and to a source of pure argon.

A weighed sample of tetramethylammonium borohydride was introduced into the tube through the inlet opening and the latter then was sealed. The tube was evacuated to $10^{-4}$ mm. mercury and pure argon admitted to a pressure which would give approximately one atmosphere after the tube had been heated to the desired temperature. The connections to the vacuum line and source of argon then were sealed off and the tube placed in a hot air oven capable of maintaining the temperature constant within $\pm 1°$ C. in the temperature range investigated. The rates of decomposition for the temperatures 150, 175, 195 and 225° C., expressed as per cent decomposition per hour, were 0.95, 4.1, 33.3 and 250. In each case there was a short induction period, the more noticeable the lower the temperature. The above rates were taken after the induction period.

Example 2

Tetramethylammonium borohydride was heated at a temperature of 220°–225° C. in a glass container connected to a vacuum line at a starting pressure of $10^{-3}$ mm. and was decomposed as represented by the formula

$$(CH_3)_4NBH_4 \rightarrow (CH_3)_3N:BH_3 + CH_4$$

The trimethylamine borine was obtained in 96% yield as a sublimation product in the form of colorless needle-like crystals and was identified by its melting point, 93–94° C., and by chemical analysis: carbon, theory 49.40%, found 49.38%; hydrogen, theory 16.58%, found 16.64%; nitrogen, theory 19.22%, found 19.33%; boron, theory 14.84%, found by difference 14.65%. The methane was identified by its vapor pressure of 12 mm. at the temperature of liquid nitrogen and the yield was estimated to be about 95%.

Trimethylamine also was obtained in a yield of about 4%. It was identified by its vapor pressure of 6 mm. at −80° C. and measured by the pressure exerted in a calibrated volume.

We claim:

1. The method for preparing alkyl substituted amine borines containing not more than 12 carbon atoms which comprises heating a quaternary ammonium borohydride containing three alkyl radicals and a fourth radical selected from the group consisting of alkyl, aryl and alkaryl radicals to a temperature above 150° C. but below the dissociation temperature of the alkyl substituted amine borine to decompose the quaternary ammonium borohydride and form a vapor comprising alkyl substituted amine borine and a hydrocarbon.

2. The method for preparing alkyl substituted amine borines containing not more than 12 carbon atoms which comprises heating a tetraalkylammonium borohydride to a temperature above 150° C. but below the dissociation temperature of the alkyl substituted amine borine to decompose the tetraalkylammonium borohydride and form a vapor consisting essentially of trialkylamine borine and a hydrocarbon.

3. The method for preparing trimethylamine borine which comprises heating tetramethylammonium borohydride to a temperature above 150° C. but below the dissociation temperature of trimethylamine borine to decompose the tetramethylammonium borohydride and form a vapor consisting essentially of trimethylamine borine and a hydrocarbon.

4. The method as described by claim 1 in which the alkyl substituted amine borine is separated by condensation.

5. The method as described by claim 2 in which the trialkylamine borine is separated by condensation.

6. The method as described by claim 3 in which the trimethylamine borine is separated by condensation.

References Cited in the file of this patent

UNITED STATES PATENTS

| Number | Name | Date |
|---|---|---|
| 2,234,581 | Rosen | Mar. 11, 1941 |

OTHER REFERENCES

Schaeffer et al.: J. A. C. S., vol. 71, 1949, pp. 2143–5.